United States Patent [19]

Bonsack

[11] 4,070,252

[45] Jan. 24, 1978

[54] PURIFICATION OF CRUDE TITANIUM TETRACHLORIDE

[75] Inventor: James Paul Bonsack, Aberdeen, Md.

[73] Assignee: SCM Corporation, New York, N.Y.

[21] Appl. No.: 788,135

[22] Filed: Apr. 18, 1977

[51] Int. Cl.$^2$ .................. C01G 23/02; B01D 3/34
[52] U.S. Cl. ................................ 203/29; 203/95; 423/69; 423/492
[58] Field of Search ............... 423/69, 492, 473; 203/29

[56] References Cited

U.S. PATENT DOCUMENTS 2,712,523   7/1955   Alpert et al. ............... 423/492 UX

FOREIGN PATENT DOCUMENTS 712,295   7/1954   United Kingdom ............... 423/492

*Primary Examiner*—Edward Stern
*Attorney, Agent, or Firm*—Jerry K. Mueller, Jr.

[57] ABSTRACT

A method for separating niobium pentachloride and tantalum pentachloride contaminants from crude titanium chloride vehicle by addition of water to said vehicle to form substantially selectively solid hydration products of such contaminants which are readily separable.

10 Claims, No Drawings

4,070,252

PURIFICATION OF CRUDE TITANIUM TETRACHLORIDE

BACKGROUND OF THE INVENTION

The present invention relates to purification of crude titanium tetrachloride resulting from the chlorination of titaniferous ores and more particularly to separating contaminant niobium pentachloride and tantalum pentachloride from the crude titanium tetrachloride in such process.

Chlorination of titaniferous ores produces predominantly titanium tetrachloride with a variety of contaminants usually in minor amounts, i.e. "impurity chlorides" including some oxychlorides, typically those of niobium, tin, vanadium (usually an oxychloride), tantalum, manganese, iron, zirconium, aluminum, magnesium, chromium and the like, depending upon the type and source of the ore. Typical of titaniferous ores include rutile, anatase, brookite, ilmenite and the like, often with the high iron-containing ores being first beneficiated for removal of most of the iron content of such ores. While most such contaminant chlorides can be removed by conventional condensation techniques or the like, niobium pentachloride generally cannot be- cause of its high volatility (high vapor pressure) and high solubility in titanium tetrachloride. Also, when vaporous titanium tetrachloride is condensed to liquid titanium tetrachloride, niobium pentachloride and tantalum pentachloride condense during such operation in solid-state condition. The niobium pentachloride and tantalum pentachloride solids can be a prime cause of line-plugging in condensing systems typically located in commercial chlorination plants.

One prior proposal (U.S. Pat. No. 2,928,722) proposes to separate niobium and/or tantalum pentachloride from metal halide mixtures containing niobium and/or tantalum pentachloride and also containing iron chloride by fractional distillation wherein any anhydrous adduct of phosphorous oxychloride and aluminum chloride is added to such mixture as a fluxing agent to accomplish such fractional distillation. Similar fractional distillation and/or fractional condensation techniques for separation and recovery of various metal chlorides are well known in the art.

The present invention for separation of niobium pentachloride and tantalum pentachloride from titanium tetrachloride vehicle is based on a heretofore unknown chemical reaction phenomenon that water will preferentially react with niobium pentachloride and tantalum pentachloride rather than with titanium tetrachloride to form solid hydration products of niobium and tantalum. By utilization of this reaction, the present invention provides a simple and economic method for purifying crude titanium tetrachloride vehicle by removing contaminant niobium pentachloride and tantalum pentachloride therefrom.

SUMMARY OF THE INVENTION

The present invention is a method for separating contaminant chloride of niobium and tantalum from crude titanium tetrachloride vehicle contaminated therewith. Such method comprises establishing a reaction mixture of said crude titanium tetrachloride vehicle with water in a proportion of water not substantially above 1 mole per mole of said contaminant chloride present. The vehicle in the reaction mixture is maintained in liquid state until a solid hydration product of said contaminant chloride (and by-product HCl) forms with essentially no net reaction of titanium tetrachloride in said vehicle. The solid hydration product of the contaminant chloride then is separated from the vehicle.

Advantages of the present invention include that the reaction of water is selective with the contaminant metal chloride for formation of its corresponding oxychloride (solid hydration product), there being substantially no net reaction of titanium tetrachloride in said vehicle. Also, the generated contaminant oxychloride is less soluble in titanium tetrachloride vehicle and less volatile in the vehicle than is the corresponding contaminant chloride. Further, the formed contaminant oxychlorides are in solid state condition so that their separation from the titanium tetrachloride vehicle can be simply, efficiently, and economically practiced in commercial scale operations.

DETAILED DESCRIPTION OF THE INVENTION

In the absence of the contaminant chlorides of niobium and tantalum, water readily reacts with titanium tetrachloride to form titanium oxychloride. The present method for forming solid hydration products of the contaminant chlorides in the presence of titanium tetrachloride is remarkable in that the selectivity or preferentiality for formation of the solid hydration products is almost absolute as virtually no net titanium oxychloride is formed. While not intending to be bound by theory, it is postulated that the reaction occurring can be summarized conventionally as follows:

I. $H_2O + TiCl_4 \rightarrow TiOCl_2 + 2HCl$
II. $TiOCl_2 + NbCl_5 \rightarrow TiCl_4 + NbOCl_3$
III. $H_2O + NbCl_5 \rightarrow NbOCl_3 + 2HCl$; and
Ia. $H_2O + TiCl_4 \rightarrow TiOCl_2 + 2HCl$
IIa. $TiOCl_2 + TaCl_5 \rightarrow TiCl_4 + TaOCl_3$
IIIa. $H_2O + TaCl_5 \rightarrow TaOCl_3 + 2HCl$ As shown in the foregoing postulated reactions, the contaminant solid hydration products are obtained by using water in a proportion not substantially above 1 mole per mole of the contaminant chloride present in the crude titanium tetrachloride vehicle.

The crude titanium tetrachloride vehicle can consist of titanium tetrachloride and a contaminant chloride of niobium and/or tantalum. Such vehicle also can be a generated stream resulting from the chlorination of titaniferous ores in which case such vehicle can contain titanium tetrachloride and a variety of impurity metal chlorides as referred to above. The present invention is substantially unaffected by the presence of such impurity metal chlorides in the crude titanium tetrachloride vehicle. It must be understood that by the terms titanium tetrachloride, niobium pentachloride, tantalum pentachloride and the like, it is meant to identify the materials of interest in the present process. Such compounds may be present in such form and also in minor amounts as dimers, trimers, or the like. Metal chlorides wherein such metal is in a different oxidation state than referred to herein also may be present in the present process. The same is true of the various hydration products or oxychlorides designated herein.

The reaction mixture is formed by mixing the crude titanium tetrachloride vehicle with water in a proportion of water not substantially above 1 mole per mole of the contaminant chloride present in such vehicle. The water can be added as a liquid or as a vapor, such as steam. The reaction mixture, preferably, is formed while the vehicle is in a liquid state, although the reaction mixture can be formed while the vehicle is a vapor. In titaniferous ore chlorination operations, the crude titanium tetrachloride vehicle is generated as a vapor often at relatively high temperatures of about 800° and sometimes as high as 1400° C or thereabouts. Such vaporous vehicle can contain significant amounts of titanium trichloride which suitably can be oxidized with chlorine gas. The water may be mixed with such vaporous vehicle either before or subsequent to such oxidation step.

The reaction mixture is maintained under conditions such that the vehicle is in liquid state. Often, such vehicle will be in liquid state merely by providing conditions such that the titanium tetrachloride in such crude vehicle is a liquid. Typically, conditions for maintaining the vehicle in liquid state include temperatures of less than about 140° C (normal boiling point of titanium tetrachloride is about 136.4° C), advantageously about 20°–120° C, and preferably about 60°–100° C, and pressures of about atmospheric or somewhat higher than atmospheric as is necessary or desirable. If the reaction mixture is formed while the crude vehicle is a vapor, such reaction mixture is cooled and/or subjected to superatmospheric pressure, for example, to liquefy the titanium tetrachloride vehicle. The solid hydration product of the contaminant chloride and by-product hydrochloric acid are formed in the liquid vehicle within a short time after the water is mixed with the vehicle, though such reaction time can range up to several hours depending upon such factors as efficiency of mixing, temperature of the reaction mixture, pressure of the reaction mixture, and the like. Advantageously, the liquid vehicle is subjected to good agitation or mixing to insure completeness of the reaction and to sustain practical times of reaction. In commercial chlorination operations, the concentration of the contaminant chloride can be as low as about 1–3% by weight so that good agitation of the reaction mixture generally will be practiced.

At the completion of the reaction, the hydration products formed in the liquid titanium tetrachloride vehicle will be in solid state. Such solid hydration products can be separated from the liquid vehicle by conventional screening, filtering or like operations. Alternatively, the liquid vehicle can be volatilized under conditions such that the solid hydration product is left substantially intact. Generally, the vehicle can be volatilized by heating to a temperature of about 140°–250° C and advantageously about 180°–220° C and 1 atmosphere total pressure. Alternatively, the vehicle can be subjected to subatmospheric pressure and much lower heating temperatures tolerated to volatilize the liquid vehicle. The solid hydration products can remain as a residual bed upon the volatilization of the liquid vehicle for separation therefrom, or the solid hydration products can be carried over with the vaporous vehicle for easy separation by cycloning or like conventional separation techniques.

The present invention is especially suited for removal of contaminant niobium pentachloride and tantalum pentachloride from the crude titanium tetrachloride vehicle resulting from chlorination of titaniferous ores as such contaminant metals are major contaminants of such crude vehicle which are extremely difficult to separate therefrom. It is conventional in processes for chlorinating titaniferous material wherein the generated crude stream containing titanium tetrachloride is quenched for removal of impurities including impurity metal chlorides, and the resulting crude titanium tetrachloride stream liquefied, that such liquefied stream sometimes contains contaminant chloride selected from niobium pentachloride, tantalum pentachloride, and mixtures thereof. The instant process is applicable to those crude titanium tetrachloride streams that contain the contaminant chloride of niobium, tantalum, and mixtures thereof for removing said contaminant chloride from said crude titanium tetrachloride stream. With commercial practice of the present invention, care must be exercised in the rate of addition of water to the crude titanium tetrachloride vehicle as formation of titanium oxychloride represents a loss of product titanium tetrachloride and such oxychloride is only slightly soluble in the titanium tetrachloride vehicle (about 0.3 to 0.5 weight percent at 20°–25° C). As the proportion of niobium pentachloride and tantalum pentachloride in the crude titanium tetrachloride vehicle can vary over time in commercial plants (especially in continuous "chloride process" plants), careful monitoring of the amount of water and the rate at which water is added should be practiced. One suitable control means involves the use of infrared spectroscopy to monitor the composition of the crude $TiCl_4$ so that excess quantities of water are not added to the crude $TiCl_4$.

It should be noted that under substantially similar reaction conditions, it has been found that the chlorides of the following listed impurity metals will not selectively react with water for formation of solid hydration products with essentially no net reaction of titanium tetrachloride: zirconium tetrachloride, silicon tetrachloride, ferrous chloride, ferric chloride and stannic tetrachloride. It also was confirmed that aluminum trichloride did selectively react with water to form a solid hydration product in titanium tetrachloride vehicle as shown in U.S. Pat. No. 2,600,881. Work on the present invention further showed that when the chlorides of aluminum, niobium, and tantalum were in liquid titanium tetrachloride vehicle, water added to such mixture would preferentially react first with aluminum trichloride (up to 1 mole of water per mole of aluminum chloride). Additional water added to the mixture would react selectively with niobium pentachloride and tantalum pentachloride (up to 1 mole of water per each mole of niobium pentachloride and tantalum pentachloride). Finally, further amounts of water would react with the titanium tetrachloride vehicle.

The following examples show in detail how the present invention can be practiced, but should not be construed as limiting. In this application, all temperatures are in degrees Centigrade and all units will be in the metric system, unless otherwise expressly indicated.

EXAMPLE I

This Example demonstrates that water selectively reacts with niobium pentachloride in titanium tetrachloride to form niobium oxychloride and HCl.

In a dry-box (nitrogen atmosphere), 3.5 grams of pure niobium pentachloride (0.013 mole) and 173 grams of pure titanium tetrachloride were transferred to a 250-milliliter, 3-neck flask containing a magnetic stir bar. The flask was fitted with a thermometer, a calcium chloride drying tube, and a polytetrafluoroethylene plastic gland with a rubber septum through which reactants could be added and samples withdrawn. The closed flask was removed from the dry-box and 0.050 grams of water (0.0028 mole) was added through the rubber septum using a precision syringe. The reaction mixture was heated at 90° C for 30 minutes, after which a 4-milliliter sample was withdrawn through the septum with a syringe. The sample was transferred to a dry centrifuge tube and centrifuged. A sample of the clear liquid from the centrifuge was transferred to a sodium chloride cell for analysis by infrared spectroscopy.

The infrared spectrum showed that no titanium oxychloride had formed because there were no absorption bands at 821, 1184, or 1356 cm$^{-1}$, the major absorption bands for titanium oxychloride. A band at 2830 cm$^{-1}$ appeared, which showed that HCl had been formed. The presence of unreacted niobium pentachloride was confirmed by an absorption peak at 845 cm$^{-1}$. The formation of niobium oxychloride was indicated by the appearance of a peak at about 770 cm$^{-1}$.

In separate experiments it was shown that the addition of the same amount of water to pure titanium tetrachloride containing no niobium pentachloride gave strong absorption at 821, 1184, and 1356 cm$^{-1}$ due to the formation of titanium oxychloride. Also, the niobium pentachloride-titanium tetrachloride mixture before addition of water showed only absorption bands corresponding to titanium tetrachloride and an absorption at 845 cm$^{-1}$ corresponding to niobium pentachloride.

Two more 0.05-gram additions of water were made to the above reaction mixture and the infrared spectra examined after each addition. No absorption bands for titanium oxychloride appeared for either sample. The NbOCl$_3$ peak at about 770 cm$^{-1}$ increased, indicating additional formation of niobium oxychloride.

After 0.23 grams of water (0.013 mole) was added to the initial reaction mixture, titanium oxychloride still was not detected. Further small additions of water, however, resulted in an increasing absorption at 821, 1184 and 1356 cm$^{-1}$, indicating formation of some titanium oxychloride.

The foregoing results demonstrate that the water reacted with the niobium pentachloride preferentially over the titanium tetrachloride until one mole of water had been added per mole of niobium pentachloride. After all of the niobium pentachloride had been converted to niobium oxychloride, additional water added to the reaction mixture reacted with the titanium tetrachloride to form titanium oxychloride.

EXAMPLE II

This Example demonstrates that niobium oxychloride is less soluble in pure titanium tetrachloride than is niobium pentachloride.

The reaction mixture mixture was formed by adding one mole of water per one mole of niobium pentachloride to pure titanium tetrachloride containing 1.0 weight-percent added niobium pentachloride. The reaction mixture was stirred in a closed flask (similar to the flask described in Example I) for 24 hours at 22° C. The flask contained a clear liquid with solids dispersed therein. A sample of the clear liquid was withdrawn from the flask and subjected to analysis by conventional wet chemistry. The results of such analysis indicated that the withdrawn clear liquid sample contained only 0.009 weight-percent niobium (expressed as niobium pentachloride). The solubility of niobium pentachloride in titanium tetrachloride at this temperature normally is 1.5 weight-percent. These results showed that about 99.4% of the niobium pentachloride in the original reaction mixture was converted to solid state niobium oxychloride by the addition of water to the titanium tetrachloride-niobium pentachloride mixture.

EXAMPLE III

This Example demonstrates that niobium oxychloride is less soluble in commercial crude titanium chloride than is niobium pentachloride.

The crude titanium tetrachloride was a sample of crude titanium tetrachloride withdrawn from a commercial chlorination plant operating in this country and contained about 85% by weight titanium tetrachloride and 15% impurities composed mainly of impurity metal chlorides. The crude titanium tetrachloride sample was heated in a closed flask at 93° C for 20 hours with stirring. A hot sample of the liquid phase was withdrawn from the flask and subjected to chemical analysis. The results of such analysis indicated that the sample contained about 0.93 weight-percent niobium (expressed as niobium pentachloride).

To the hot crude titanium tetrachloride sample was added 0.3 weight percent water. Another hot sample was withdrawn from the flask and filtered for analysis. The clear titanium tetrachloride sample was found to contain 0.005 weight percent niobium (expressed as niobium pentachloride). These results demonstrate that over 99% of the niobium pentachloride in the original crude titanium titanium tetrachloride sample was removed as solid niobium oxychloride by the addition of water to such crude titanium tetrachloride sample.

EXAMPLE IV

This Example demonstrates that niobium oxychloride is less volatile in pure titanium tetrachloride than is niobium pentachloride.

A sample of pure titanium tetrachloride containing 3.0 weight-percent added niobium pentachloride was distilled using a very short, unpacked distillation column. Distillation temperature corresponded to the atmospheric boiling point of titanium tetrachloride (136° C). Use of the short, unpacked distillation column permits collection of the vapor in equilibrium with the liquid and minimizes any fractionation of niobium and titanium chlorides during the distillation operation. After approximately 30% of the sample had been distilled, the distillation operation was stopped. The distillate was analyzed and found to contain 733 parts per million (ppm) of niobium (expressed as niobium pentachloride).

Another distillation was made using the same niobium pentachloridetitanium tetrachloride mixture, except that this sample had added to it 1.0 mole of water per mole of niobium pentachloride in the sample. After about 30% of the reaction mixture was distilled, the distillation was stopped and the distillate analyzed. The distillate was found to contain only 95 ppm of niobium (expressed as niobium pentachloride). These results show that the co-distillation of niobium was reduced by about 87% by the addition of water to the reaction mixture and resulting formation of niobium oxychloride.

EXAMPLE V

This Example demonstrates that niobium oxychloride is less volatile in commercial crude titanium tetrachloride than is niobium pentachloride.

A sample of the commercial crude titanium tetrachloride of Example III (prior to addition of water) was distilled according to the procedure described in Example IV. The distillate was analyzed and found to contain 233 ppm niobium (expressed as niobium pentachloride).

A sample of the crude commercial titanium tetrachloride from Example III where water had been added to such crude titanium tetrachloride was distilled under substantially the same conditions as above described. The distillate was analyzed and found to contain only 38 ppm of niobium (expressed as niobium pentachloride). These results demonstrate that the co-distillation of niobium in crude commercial titanium tetrachloride was decreased 84% by the addition of water to the crude TiCl$_4$ and resulting formation of niobium oxychloride.

EXAMPLE VI

This example demonstrates that water selectively reacts with tantalum pentachloride in titanium tetrachloride to form tantalum oxychloride and HCl.

In a closed flask similar to the flask described in Example I, 3.5 grams of pure tantalum pentachloride (0.0097 mole) and 173 grams of pure titanium tetrachloride were mixed. The closed flask was heated at 95° C for 30 minutes, after which a 4-milliliter sample was withdrawn through the septum using a syringe. The sample was transferred to a dry centrifuge tube and centrifuged. A sample of the clear, cooled liquid was transferred to a sodium chloride cell for analysis by infrared spectroscopy. The infrared spectrum showed that only titanium tetrachloride and tantalum pentachloride were present (tantalum pentachloride being indicated by absorption bands at 798 and 698 cm$^{-1}$).

Using a precision syringe, 0.120 grams of water (0.067 mole) was added to the titanium tetrachloride-tantalum pentachloride mixture through the septum. This reaction mixture was heated at about 95° C for 15 minutes, after which a 4-milliliter sample was taken. This sample was centrifuged and subjected to infrared spectroscopy as described above. The infrared spectrum was similar to that of the initial reaction mixture before the addition of water thereto, except that the absorption bands at 798 and 698 cm$^{-1}$ were substantially reduced.

After a total of 0.16 grams of water (0.0088 mole) was added to the initial reaction mixture, the stronger tantalum pentachloride absorption band at 798 cm$^{-1}$ still was present. No absorption bands for titanium oxychloride were observed. It should be noted that the formation of tantalum oxychloride could not be determined with absolute certainty because its infrared spectrum is not reported in the literature.

After a small excess of water was added to the reaction mixture (0.011 moles of water or 1.13 moles of water per mole of tantalum pentachloride), the absorption bands of tantalum pentachloride disappeared and an absorption band at 821 cm$^{-1}$ appeared which indicated the presence of titanium oxychloride.

These results demonstrate that the water reacted with tantalum pentachloride preferentially over the titanium tetrachloride until about 1 mole of water per mole of tantalum pentachloride had been added to the reaction mixture. After all of the tantalum pentachloride had been converted to tantalum oxychloride, additional water added to the reaction mixture reacted with the titanium tetrachloride to form titanium oxychloride.

I claim:

1. A method for separating contaminant chloride of niobium and/or tantalum from crude titanium tetrachloride vehicle contaminated therewith, which comprises:
    establishing a reaction mixture of said crude titanium tetrachloride vehicle with water in a proportion of water not substantially above 1 mole per mole of said contaminant chloride present;
    maintaining said vehicle in liquid state until a solid hydration product of said contaminant chloride forms with essentially no net reaction of titanium tetrachloride in said vehicle with said water; and
    separating said solid hydration product of said contaminant chloride from said vehicle.

2. The method of claim 1 wherein said reaction mixture is maintained at a temperature of less than about 140° C.

3. The method of claim 2 wherein said temperature is from about 20° to about 120° C.

4. The method of claim 1 wherein said crude titanium tetrachloride vehicle results from the chlorination of titaniferous materials.

5. The method of claim 1 wherein said separating step is done by volatilization of said vehicle under conditions leaving said solid hydration product substantially intact.

6. The method of claim 5 wherein said volatilization is accomplished by heating said vehicle to a temperature of about 140° to about 250°.

7. The process of claim 1 wherein said separation step is done by filtration.

8. In a process for chlorination of titaniferous material wherein a generated crude stream containing titanium tetrachloride is quenched for removal of impurities including impurity metal chlorides, and the resulting crude titanium tetrachloride stream liquefied, the improvement for removing contaminant chloride selected from niobium pentachloride, tantalum pentachloride, and mixtures thereof from said liquefied crude titanium tetrachloride stream which comprises;
    establishing a reaction mixture of said crude stream with water in a proportion of water not substantially above 1 mole per mole of said contaminant chloride present;
    maintaining said reaction mixture for a time sufficient until a solid hydration product of said contaminant chloride forms with essentially no net reaction of said titanium tetrachloride in said stream with said water; and
    separating said solid hydration product from said reaction mixture.

9. The process of claim 8 wherein said reaction mixture is established and maintained at a temperature of less than about 140° C.

10. The process of claim 8 wherein said separation step is done by volatilization of said vehicle at a temperature of up to about 250° C and said solid hydration product is separated from resulting vaporous vehicle.

* * * * *